Sept. 27, 1927.
J. F. STYER ET AL
1,643,593
SIDE LIGHT FOR AUTOMOBILES
Filed Oct. 9, 1926
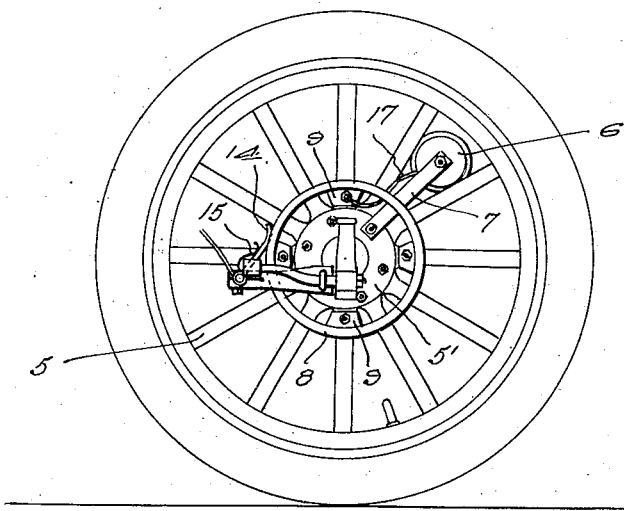
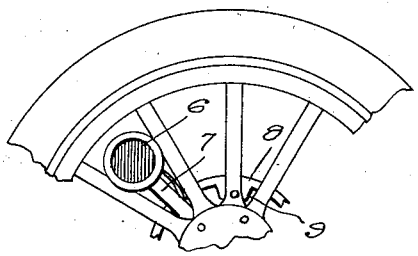
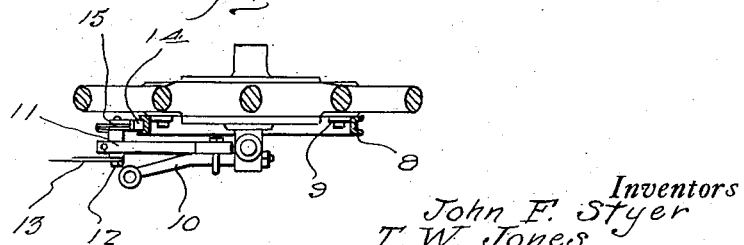
Inventors
John F. Styer
T. W. Jones
By Clarence A. O'Brien
Attorney Patented Sept. 27, 1927.

1,643,593

UNITED STATES PATENT OFFICE.

JOHN F. STYER AND THOMAS W. JONES, OF GREELEY, COLORADO.

SIDE LIGHT FOR AUTOMOBILES.

Application filed October 9, 1926. Serial No. 140,550.

This invention relates to lights for automobiles and has more particular reference to a light that is adapted to be associated with one or more of the wheels of an automobile so that the automobile will be illuminated at its sides with the result that it can be seen by motorists while passing a crossing.

One of the main objects of the invention resides in the provision of a light and electric current conducting means constructed for cooperative association with an automobile wheel so that the light will be illuminated regardless of the speed of rotation of the wheel.

A further and important object is to provide a device of this character that is extremely simple of construction and one that may be applied to various types of automobile wheels.

With the foregoing and other objects in view as the nature of the invention is better understood, the same comprising the novel form, combination, and arrangement of parts hereinafter more fully described, shown in the accompanying drawing and claimed.

In the drawing wherein like reference characters indicate corresponding parts throughout the several views:

Figure 1 is an inner side elevation of an automobile wheel provided with a side light and current conducting means constructed in accordance with the present invention.

Figure 2 is a fragmentary outer side elevation of the wheel so equipped, and

Figure 3 is a fragmentary section therethrough showing my improved current conducting means partly in top plan and partly in cross section.

Now having particular reference to the drawing, 5 designates a conventionally constructed automobile wheel, while 6 designates an electric light preferably of circular formation that is arranged between a pair of the wheel spokes in such a manner that the lamps of the light will be at the outer side of the wheel as indicated in Figure 2. This light is secured to the metal plate 5' at the inner side of the wheel hub by reason of a metallic arm 7, said arm being in circuit with the electric bulb, not shown, arranged within the light casing.

Arranged concentrically around the hub of the wheel 5 at the inner side thereof is a metallic ring 8 formed at its inner edge with inwardly extending lugs 9 to permit the attachment to the ring to the spokes of the wheel as disclosed in Figures 1 and 2.

Secured to the wheel spindle arm 10 is a rearwardly extending horizontal arm 11 of nonconducting material, the outer end of which is provided with a cross bolt 12 to one end of which is connected an electric wire 13. To the inner end of this bolt is connected a metallic ring wiping finger 14 that is maintained in engagement with the ring 8 by reason of a spring finger 15.

Connecting the ring 8 and the socket for the bulb (not shown), within the casing of the light 6 is a wire 17.

Obviously the wire 13 is to be attached to the positive pole of the automobile storage battery while the other pole of the battery is, as well known, grounded to the machine frame in circuit with which ground is the lamp supporting arm 7.

Obviously the circuit will be completed to the light 6, whenever a suitable switch, (not shown) that may be arranged in the circuit is closed and this regardless of the speed of rotation of the wheel 5 resulting in the illumination of the side of the vehicle for reasons hereinbefore pointed out.

Even though we have herein shown and described the invention as consisting of certain detail structural elements it is nevertheless to be understood that some changes may be made therein without affecting the spirit and scope of the appended claim.

Having thus described the invention, what we claim as new and desire to secure by Letters Patent is:—

In an automobile wheel light structure of the class described, an annular channel ring provided with lugs adapted to be fastened to wheel spokes to dispose the ring in concentric relationship on the wheel, an electric lamp including a housing and an attaching arm, said arm adapted to be connected with the hub structure of the wheel and to radiate outwardly beyond the rim, an attaching arm adapted to be connected with the steering gear spindle arm, and the resilient contact finger carried by said arm and having its free end located in the channel for wiping electrical contact, and current supply means.

In testimony whereof we affix our signatures.

JOHN F. STYER.
THOMAS W. JONES.